United States Patent
Frisinger et al.

(10) Patent No.: US 12,056,804 B2
(45) Date of Patent: Aug. 6, 2024

(54) FAST INCREMENTAL SHARED CONSTANTS

(71) Applicant: QUALCOMM Incorporated, San Diego, CA (US)

(72) Inventors: Thomas Edwin Frisinger, Shrewsbury, MA (US); Richard Hammerstone, Tyngsboro, MA (US); Andrew Evan Gruber, Arlington, MA (US); Gang Zhong, San Diego, CA (US); Yun Du, San Diego, CA (US); Jonnala Gadda Nagendra Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/317,825

(22) Filed: May 15, 2023

(65) Prior Publication Data
US 2023/0290034 A1    Sep. 14, 2023

Related U.S. Application Data

(62) Division of application No. 17/085,272, filed on Oct. 30, 2020, now Pat. No. 11,694,384.

(51) Int. Cl.
*G06T 15/00* (2011.01)
*G06F 9/30* (2018.01)
(Continued)

(52) U.S. Cl.
CPC ........ *G06T 15/005* (2013.01); *G06F 9/30101* (2013.01); *G06F 9/30123* (2013.01);
(Continued)

(58) Field of Classification Search
CPC .......... G06T 15/005; G06T 1/20; G06T 1/60; G06T 15/80; G06T 2200/28; G06F 9/30101; G06F 9/30123
See application file for complete search history.

(56) References Cited

U.S. PATENT DOCUMENTS 7,692,660 B2 * 4/2010 Markovic ............. G06T 15/005
345/530
8,120,608 B2   2/2012 Jiao et al.
(Continued)

OTHER PUBLICATIONS

Blythe D., "The Direct3D 10 System", ACM, International Conference on Computer Graphics and Iinteractive Techniques, ACM Siggraph, USA, Jul. 1, 2006 (Jul. 1, 2006), pp. 724-734, XP058326253, p. 729, left-hand column, paragraph 2-paragraph 4, figures 1, 3 page 731, left-hand column, paragraph 4-right-hand column, paragraph 5.
(Continued)

*Primary Examiner* — Maurice L. McDowell, Jr.
*Assistant Examiner* — Donna J. Ricks
(74) *Attorney, Agent, or Firm* — Procopio, Cory, Hargreaves & Savitch

(57) ABSTRACT

This disclosure provides systems, devices, apparatus, and methods, including computer programs encoded on storage media, for fast incremental shared constants. In aspects, a CPU may determine/update shared constant data for a first draw call of a plurality of draw calls. The shared constant data, which may correspond to at least one shader, may be updated based on a draw call update for the first draw call. The CPU may communicate the updated shared constant data for the first draw call to a GPU. The GPU may receive, in at least one register, the updated shared constant data from the CPU and configure the at least one register based on the updated shared constant data corresponding to the draw call update of the first draw call of the plurality of draw calls.

13 Claims, 7 Drawing Sheets

(51) Int. Cl.
  *G06T 1/20* (2006.01)
  *G06T 1/60* (2006.01)
  *G06T 15/80* (2011.01)

(52) U.S. Cl.
  CPC ............... *G06T 1/20* (2013.01); *G06T 1/60* (2013.01); *G06T 15/80* (2013.01)

(56) References Cited

U.S. PATENT DOCUMENTS

| | | |
|---|---|---|
| 8,593,465 B2 | 11/2013 | Leather et al. |
| 9,799,094 B1 | 10/2017 | Chen et al. |
| 10,157,443 B1 | 12/2018 | Hammerstone et al. |
| 2008/0021679 A1 | 1/2008 | Bleiweiss et al. |
| 2018/0232846 A1 | 8/2018 | Gruber et al. |
| 2020/0379767 A1* | 12/2020 | McCrary .................. G06T 1/20 |
| 2022/0139021 A1 | 5/2022 | Frisinger et al. |

OTHER PUBLICATIONS

International Search Report and Written Opinion—PCT/US2021/052291—ISA/EPO—Jan. 18, 2022.
Laplante P.A., "Configuration" In: "Comprehensive Dictionary of Electrical Engineering", Jan. 1, 2005 (Jan. 1, 2005), Taylor & Francis, XP55874247, pp. 1-3, "Configuration", p. 138.

\* cited by examiner

FAST INCREMENTAL SHARED CONSTANTS

CROSS REFERENCE TO RELATED APPLICATION

This application is a Divisional of U.S. Non-provisional application Ser. No. 17/085,272, entitled "FAST INCREMENTAL SHARED CONSTANTS", and filed on Oct. 30, 2020, which is expressly incorporated by reference herein in its entirety.

BACKGROUND

Technical Field

The present disclosure relates generally to processing systems, and more particularly, to one or more techniques for graphics processing.

INTRODUCTION

Computing devices often perform graphics processing (e.g., utilizing a graphics processing unit (GPU)) to render graphical data for display by the computing devices. Such computing devices may include, for example, computer workstations, mobile phones such as smartphones, embedded systems, personal computers, tablet computers, and video game consoles. GPUs are configured to execute a graphics processing pipeline that includes one or more processing stages which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A device that provides content for visual presentation on a display may utilize a GPU.

GPU operations may be based on shader processing techniques that utilize non-incremental constants. This may be beneficial in binning architectures because it can allow each draw call to be independent. However, non-incremental constants may not be the most efficient technique in some instances. Accordingly, there is a need for improved shader processing techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Constant data utilized for shader processing may be loaded to a dedicated block of constant memory and may remain constant across an entire draw call. Constants indicated via the constant data may be changed for subsequent draw calls, such as when lighting relationships change with respect to items/features within a frame. In order to change the constants for the subsequent draw calls, all new constant data may be loaded to the constant memory/constant buffer, even if a small amount of the constant data is to be changed from a previous version of the constant data. In some cases, the entire constant buffer may be copied to change a small subset of the constants in the constant buffer, so that GPU commands currently being processed based on a prior version of the constant buffer are not impacted by the changes to the constant buffer. Copying the entire constant buffer each time a change to the constant buffer is to occur may result in significant overhead associated with determining when to release each version of the constant buffer and may provide a pipeline of constant buffers.

Accordingly, shared constants, which are constants that may be shared across different shader stages, may be configured to appear to a driver interface as context registers. The shared constants may be loaded to a register storage in an incremental manner. Based on execution of a shader preamble, the driver may program the shared constants/context registers to be mapped to the constant memory/constant buffer in a non-incremental manner. The shader preamble may be executed once per draw call before a main portion of the shader to copy the shared constants from the context registers to the constant memory/constant buffer on an as-needed basis. For instance, if three shared constants are copied to the constant memory for a first draw call and another three shared constants are copied to the constant memory for a second draw call, six shared constants may be available for the second draw call. After the shared constants are loaded to the constant memory from the register data, shader execution may be performed as usual, regardless of whether the constants are shared constants or regular/unshared constants.

In an aspect of the disclosure, a method, a computer-readable medium, and an apparatus are provided. The apparatus may include a memory and at least one processor coupled to the memory. The memory may include instructions that, when executed by the at least one processor, cause the at least one processor to receive, in at least one register, shared constant data from a CPU, the shared constant data corresponding to a draw call update of a first draw call of a plurality of draw calls; and configure the at least one register based on the shared constant data corresponding to the draw call update of the first draw call.

In a further aspect of the disclosure, a method, a computer-readable medium, and an apparatus are provided. The apparatus may include a memory and at least one processor coupled to the memory. The memory may include instructions that, when executed by the at least one processor, cause the at least one processor to determine shared constant data for a first draw call of a plurality of draw calls, the shared constant data corresponding to at least one shader; update the shared constant data for the first draw call, the shared constant data being updated based on a draw call update for the first draw call; and communicate the updated shared constant data for the first draw call to at least one register of a GPU.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
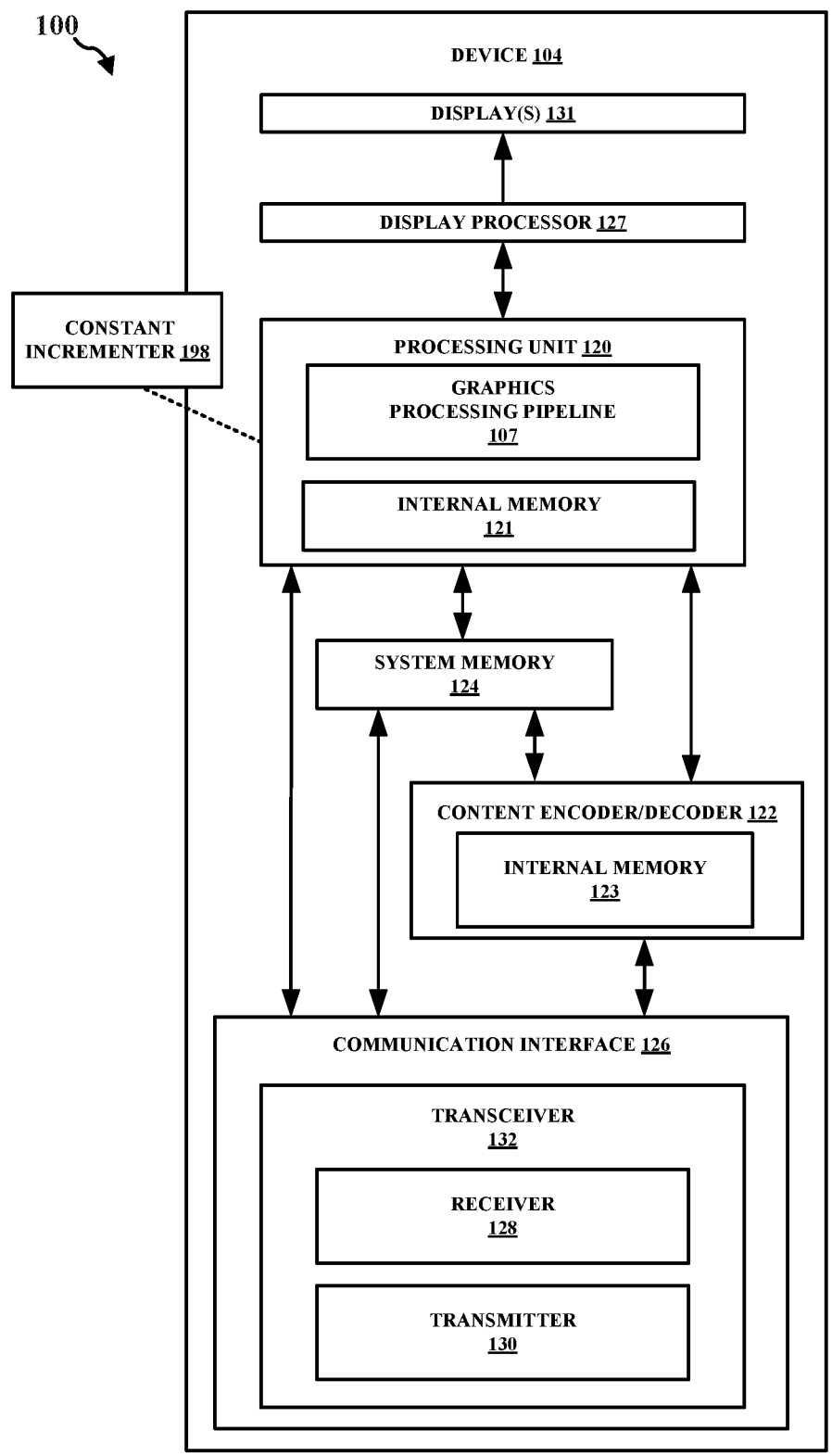
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

Constant data utilized for shader processing may be loaded to a dedicated block of constant memory and may remain constant across an entire draw call. Constants indicated via the constant data may be changed for subsequent draw calls, such as when lighting relationships change with respect to items/features within a frame. In order to change the constants for the subsequent draw calls, all new constant data may be loaded to the constant memory/constant buffer, even if a small amount of the constant data is to be changed from a previous version of the constant data. In some cases, the entire constant buffer may be copied to change a small subset of the constants in the constant buffer, so that GPU commands currently being processed based on a prior version of the constant buffer are not impacted by the changes to the constant buffer. Copying the entire constant buffer each time a change to the constant buffer is to occur may result in significant overhead associated with determining when to release each version of the constant buffer and may provide a pipeline of constant buffers.

Accordingly, shared constants, which are constants that may be shared across different shader stages, may be configured to appear to a driver interface as context registers. The shared constants may be loaded to a register storage in an incremental manner. Based on execution of a shader preamble, the driver may program the shared constants/context registers to be mapped to the constant memory/constant buffer in a non-incremental manner. The shader preamble may be executed once per draw call before a main portion of the shader to copy the shared constants from the context registers to the constant memory/constant buffer on an as-needed basis. For instance, if three shared constants are copied to the constant memory for a first draw call and another three shared constants are copied to the constant memory for a second draw call, six shared constants may be available for the second draw call. After the shared constants are loaded to the constant memory from the register data, shader execution may be performed as usual, regardless of whether the constants are shared constants or regular/unshared constants.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before the frames are displayed by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a constant incrementer 198 configured to receive, in at least one register, shared constant data from a CPU, the shared constant data corresponding to a draw call update of a first draw call of a plurality of draw calls; and configure the at least one register based on the shared constant data corresponding to the draw call update of the first draw call. In further aspects, the constant incrementer 198 may be configured to determine shared constant data for a first draw call of a plurality of draw calls, the shared constant data corresponding to at least one shader; update the shared constant data for the first draw call, the shared constant data being updated based on a draw call update for the first draw call; and communicate the updated shared constant data for the first draw call to at least one register of a GPU.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
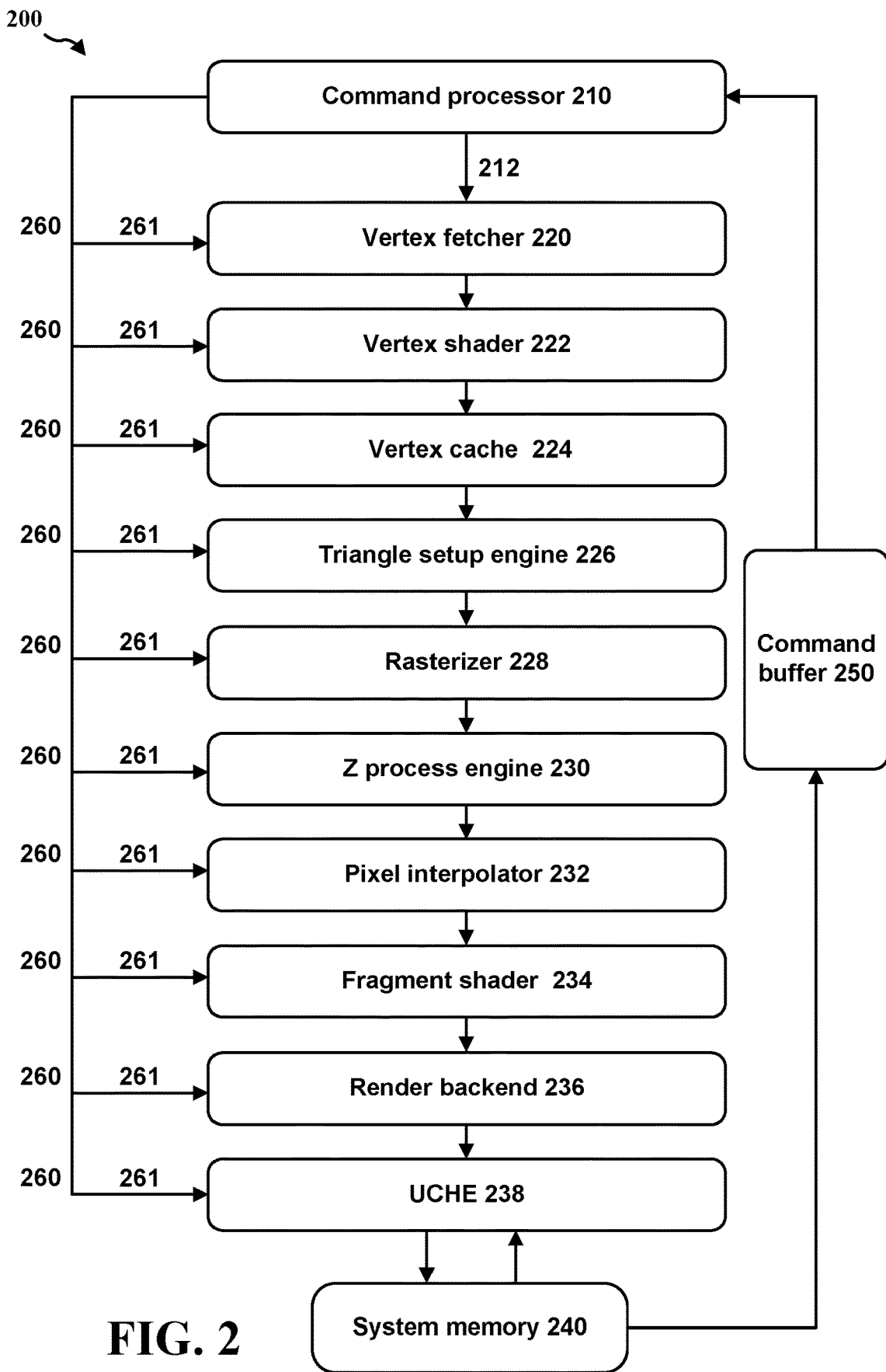
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include any number of =processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering, an image can be divided or separated into different sections or tiles. After the division of the image, each section or tile can be rendered separately. Using tiled rendering, GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified. In contrast to tiled rendering, direct rendering does not divide the frame into smaller bins or tiles. Rather, in direct rendering, the entire frame is rendered at a single time. Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
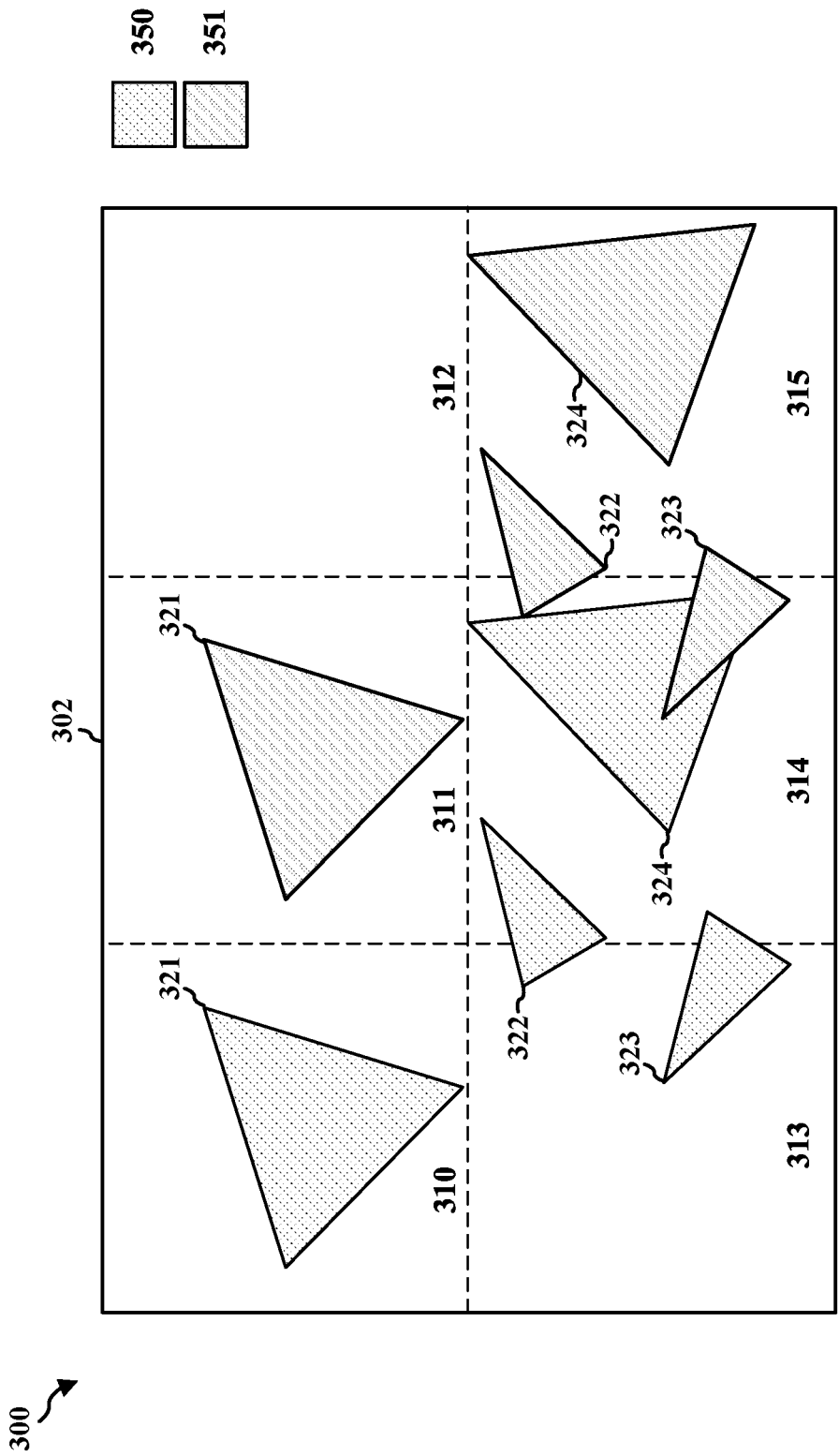
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, wherein, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

Figure 4:
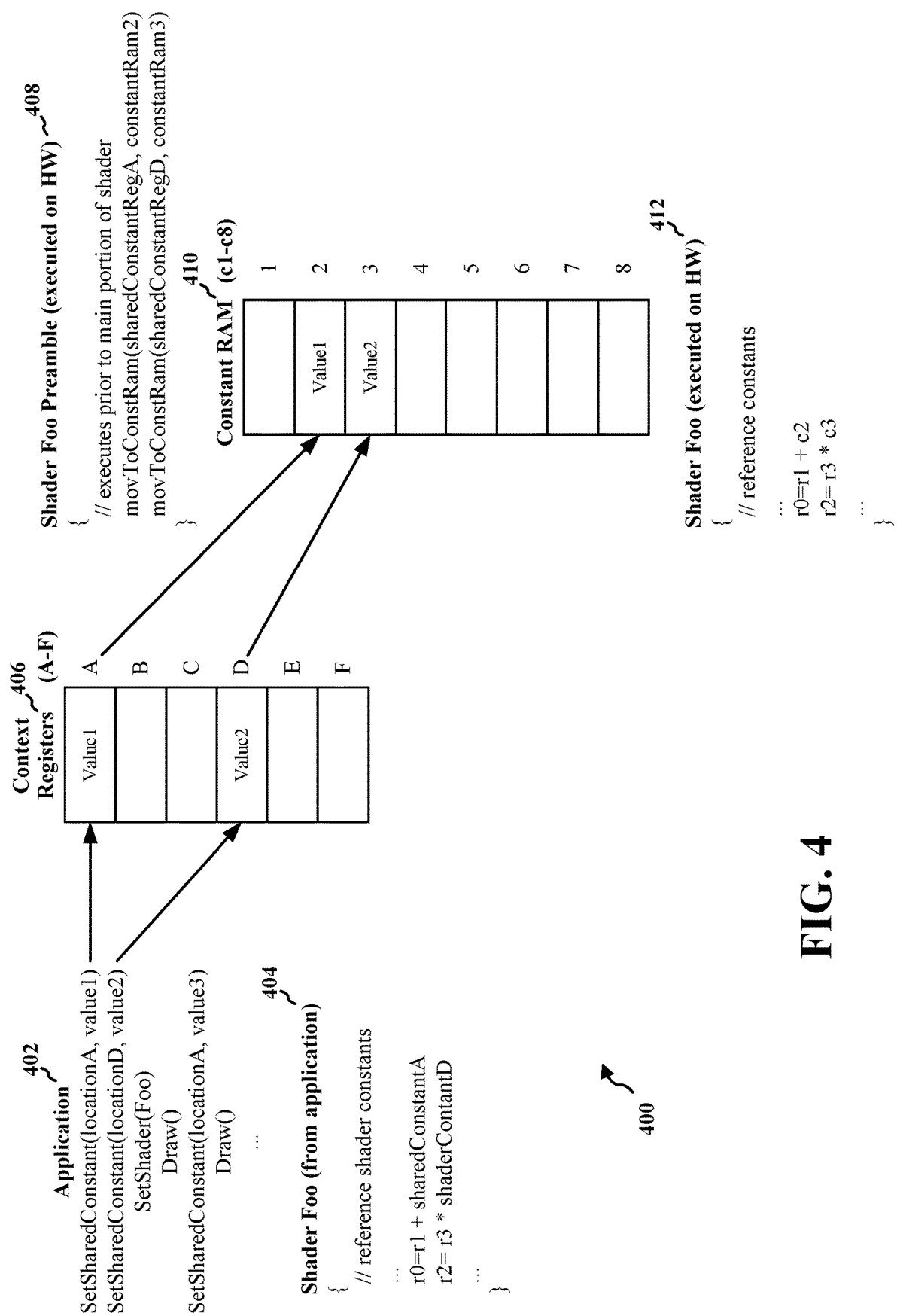
FIG. 4 illustrates a diagram corresponding to an example technique for providing incremental shared constants in accordance with one or more techniques of this disclosure.

FIG. 4 is a diagram 400 corresponding to an example technique for providing incremental shared constants. In examples, shader processing may be associated with a shader code corresponding to GPU instructions, resources (e.g., textures, surfaces, etc.) that may receive data for rendering a frame, and/or constant data that may be loaded by an application. Constant data (e.g., c1-c8) may be constant across an entire draw call and may utilize a block of dedicated constant RAM 410. While a same shader may be executed from draw call to draw call to render a portion of a frame, constants 1-8 indicated via the constant data c1-c8 may be changed for rendering different items/features within the frame, as the constants 1-8 may indicate, e.g., a relationship between lighting and the items/features within the frame. New constant data may be loaded to the constant RAM 410 for each draw call, as prior constant data may be non-incremental. That is, a driver may be configured to fully update the constant data c1-c8 used for each of the draw calls/shaders (e.g., even if a small amount of constant data c1-c8 is to be changed), as the driver may not provide incremental updates to the constant RAM 410.

Non-incremental constant data may be advantageous for binning architectures where each draw call may be independent of other draw calls such that shader execution may promptly proceed to draw calls that may be visible for a given bin. However, at the application level (e.g., at application 402) there may be instances where GPU performance may be increased by allowing a small amount of constant data c1-c8 to change both rapidly and incrementally between draw calls. Nevertheless, since constant data c1-c8 may be loaded as a single set of data, changing a subset of the constant data c1-c8 may introduce complexities in shader processing operations.

The constants 1-8 may be stored in a constant buffer (e.g., constant RAM 410) and the shader may index to the constant buffer to load the constants 1-8. In some cases, constants 1-8 may be stored in multiple constant buffers. By generating a constant buffer, updates to the constants 1-8 may be performed on the CPU, since the driver may be configured to perform the updates. However, if one or more GPU commands are currently being processed/executed, the entire constant buffer may be copied and changed based on the subset of constants to be changed in the copied constant buffer, so that the currently processing/executing GPU commands based on a prior version of the constant buffer are not impacted by the change to the constant buffer. Copying the entire constant buffer each time a change to the constant buffer is to occur may result in significant overhead associated with determining when to release each version of the constant buffer after GPU execution has completed. Further, a pipeline of constant buffers may be provided based on copying the constant buffer each time the subset of the constants in the constant buffer is changed.

Some graphics application program interfaces (APIs) may be configured to generate shared constants (e.g., Value1 and Value2 in the diagram 400) that may be shared across different shader stages. For example, a pixel shader configured to color pixels based on textures, lighting algorithms, etc. may have shared constants with a vertex shader configured to rasterize primitives or triangles in a frame that includes the pixels. Shared constants may also be referred to as root constants or push constants, which may be pushed directly from the application 402 to the GPU with a low overhead. In examples, the application 402 may include instructions such as SetSharedConstant (location A, Value1) and SetSharedConstant (location D, Value2) to indicate shared constants using the register data A-F. A shader foobar (foo) 404 from the application 402 may reference the shared constants based on instructions such as r0=r1+sharedConstantA and r2=r3*sharedConstantD. After a first draw call is executed for the application 402 based on the instructions, the application 402 may change an indication of the shared constants (e.g., SetSharedConstant (location A, Value1) may be changed to SetSharedConstant (location A, Value3)) and a second draw call may be executed for the application 402.

Depending on a configuration of the graphics API, shared constants may be 32-bit constants that may range in number from 32 to 128 (e.g., compared to regular/unshared constants that may range in number up to 512 for some hardware configurations). Some shaders may utilize more than 512 constants. However, a cost may be associated with the total number of constants exceeding a threshold value, such as 512, as an excess number of the constants may have to be fetched from main memory, rather than being retrieved from on-chip memory. Accordingly, a number of shared constants, e.g., 32 shared constants, may be used to rapidly and incrementally change a portion of the constant data c1-c8 with lower overhead than may be incurred based on updating all the constant data c1-c8 for each invocation of the shader.

While some graphics APIs may be based on incremental shared constants, if such shared constants are included in a constant store/constant memory buffer, the shared constants may conflict with a binning architecture that may be based on a non-incremental constant store. Accordingly, shared constants may be configured to appear as context registers 406 to a driver interface so that the shared constants may be treated as context register states instead of constant states, as context register states may be incremental. The context registers 406 may be similar to pipeline registers for a draw state, since the context registers 406 may be pipelined via GPU hardware. After the shared constants are loaded into context registers 406 (e.g., register A and register D), the information may remain the same unless/until the context registers 406 are updated by the driver.

The context registers 406 may be mapped to the constant RAM 410 in a non-incremental fashion, given that shaders in some GPUs may not have direct access to a register bus for pulling register data A-F. The driver may load the shared constants into the context registers 406 (e.g., up to 128 constants may be dedicated as shared constants associated with the shared constant state). The driver may update the context registers 406, which may reside in the GPU, as the driver receives updated information for the shared constants. A register storage for the context registers 406 may be maintained across draw calls, where the draw calls may each include a command for defining one or more of the context registers 406. Based on an incremental process, the driver may program all of the shared constant registers (e.g., registers A and D) to be mapped to the constant RAM 410. For instance, the driver may generate a plurality of commands, some of which may include register rights. An example register right may indicate that particular context registers (e.g., registers A and D) may be respectively mapped to particular constants (e.g., constants 2 and 3). The command may be based on a memory address of the particular registers and the data that is to be mapped to the particular constants.

Since the driver may be configured to program a plurality of register states for a draw call, registers (e.g., registers A and D) corresponding to the shared constants (e.g., Value1 and Value2) may be included with the other register states for the draw call. The shader hardware may be further configured to provide pipelining functionality, so that register states/GPU commands that are currently processing are not impacted by updates to the register states. In this manner, shared constant data may be provided to the GPU. The shader hardware may include a streaming processor (SP) that executes shader instructions, such as shader foo 412, on the shader hardware. In examples, the shader foo 412 may reference the constants 1-8 based on instructions such as r0=r1+c2 and r2=r3*c3.

The shader hardware may also include a high level sequencer (HLSQ) that prepares information for the SP to execute. The HLSQ may execute an early preamble/preamble shader, which may be a portion of shader code that is executed before a main portion of the shader is executed. The preamble shader may include a store shared constant (stsc) instruction that may copy the shared constants (e.g., Value1 in register A and Value2 in register D) from the context registers 406 to the constant RAM 410 (e.g., constant 2 and constant 3). In examples, a shader foo preamble 408 may be executed on the shader hardware based on stsc instructions such as movToConstRam (sharedConstantRegA, constantRam2) and movToConstRam (sharedConstantRegD, constantRam3).

The preamble shader may not be configured to determine substantive information/values indicated by the shared constants. Rather, the preamble shader may determine that certain registers, such as register A and register D, include shared constants that are associated with information for executing a particular draw call. Thus, the stsc instruction of the preamble shader may be executed to copy the shared constants included in the certain registers into the constant RAM 410. Other instructions in the preamble shader may include loading the regular/unshared constant data into the constant RAM 410. The constant RAM 410 may serve as a cache that is setup before the SP executes the main shader. Since the shader may be configuring shared constants for a next invocation of the shader while a current invocation of the shader is executing, pipelining may be performed so that the current invocation of the shader is not impacted by configuring the next invocation of the shader.

The HLSQ that moves data from the context registers 406 to the constant store/constant RAM 410 may execute the preamble shader once before every draw call. Constant data c1-c8 may be loaded into the constant RAM 410 for a particular draw call and, on a next draw call, constant data corresponding to the next draw call may be loaded into the constant RAM 410. The preamble shader may copy the register data A-F from the context registers 406 into the constant RAM 410 based on the stsc instruction. For example, if a first shader is to be executed that utilizes 3 shared constants, the preamble shader may copy the 3 shared constants from the context registers 406. If a second shader is to be executed after the first shader that utilizes a different set of shared constants (e.g., with or without overlapping constant data c1-c8), the preamble shader may be executed again to load/copy the different set of shared constants from the context registers 406. The shared constants may be carried over for each draw call, such that if 3 shared constants are copied on the first draw call and another 3 shared constants are copied on the second draw call, 6 shared constants may be available for the second draw call based on the shared constants being incrementally accumulated via the preamble shader independently updating the shared constants with each invocation of the shader. Thus, the full set of shared constants may not get copied at once, as the preamble shader may move the shared constants into the constant store on an as-needed basis.

A shader compiler may be configured to determine which shared constants are to be used by the shader and may move the determined shared constants from the register data A-F into the constant RAM 410. After the register data A-F is loaded into constant storage for the GPU, shader execution may be performed as usual regardless of whether the constants 1-8 are shared constants or regular constants. That is, after a shader constant state is loaded in the shader constant RAM, the shader constant state may be moved to working constant RAM similar to other constant data used for shader execution. By allowing the shader compiler to determine the shared constants that may be used for shader execution, such constants may be loaded on an individual basis without having to load an entire block of shared constants.

Figure 5:
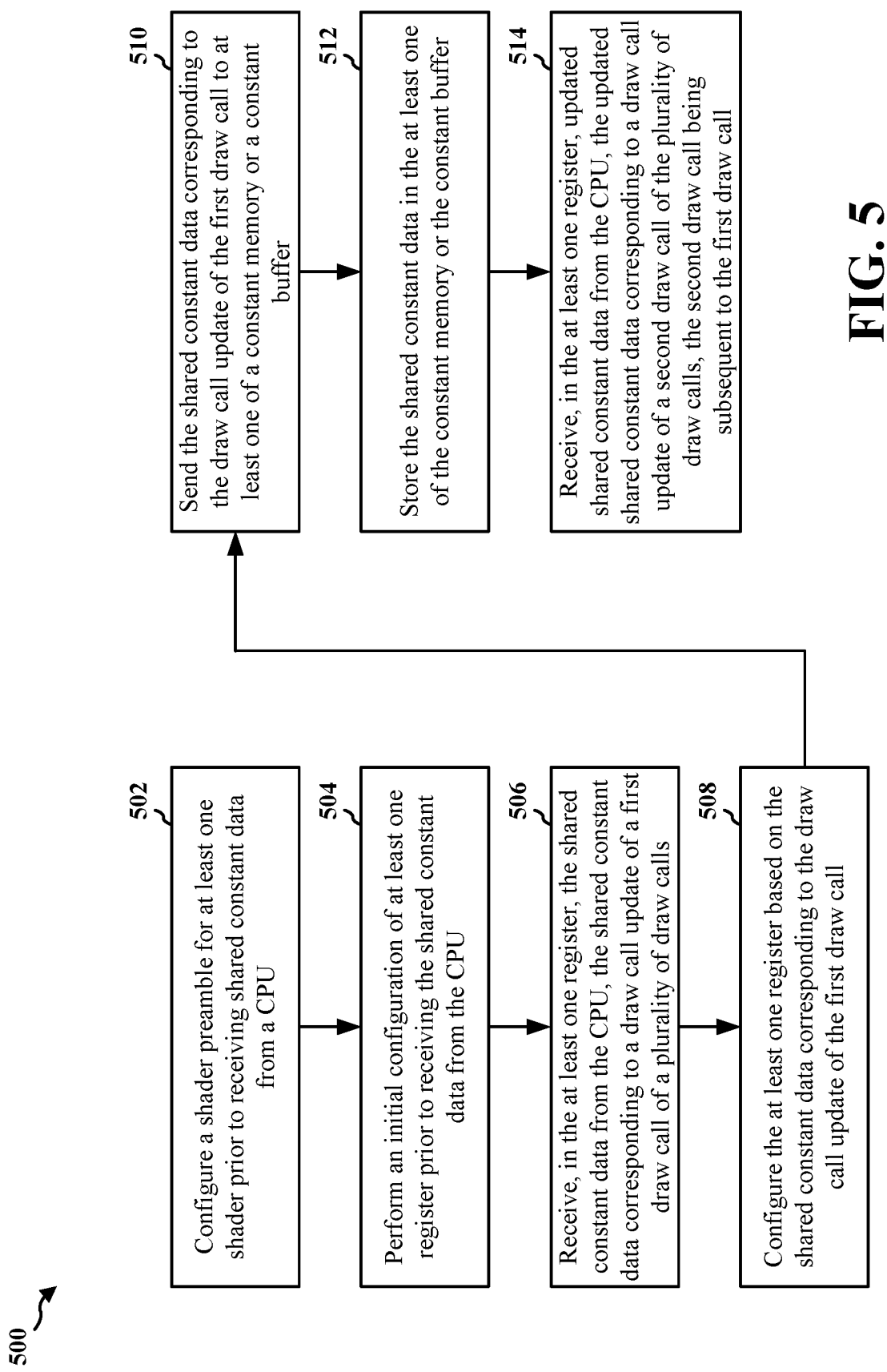
FIG. 5 is a flowchart of an example method of graphics processing in accordance with one or more techniques of this disclosure.

FIG. 5 is a flowchart of an example method 500 in accordance with one or more techniques of this disclosure. The method 500 may be performed by an apparatus, such as an apparatus for graphics processing, a GPU, a wireless communication device, and the like, as used in connection with the aspects of FIGS. 1-4 and 7.

At 502, the apparatus may configure a shader preamble for at least one shader prior to receiving shared constant data from a CPU. For example, referring to FIGS. 4 and 7, the shader foo preamble 408 that executes prior to the main portion of the shader may be configured prior to receiving sharedConstantRegA and sharedConstantRegD (e.g., the GPU 704 may configure the shader preamble, at 712, prior to receiving, at 714, the updated shared constant data from the CPU 702). The shared constant data (e.g., sharedConstantRegA and sharedConstantRegD) may be received based on the shader preamble for the at least one shader (e.g., based on execution of the movToConstRam (sharedConstantRegA, constantRam2) instruction and/or the movToConstRam (sharedConstantRegD, constantRam3) instruction of the shader foo preamble 408). The at least one shader may include at least one of a vertex shader, a fragment shader, or a geometry shader.

At 504, the apparatus may perform an initial configuration of at least one register prior to receiving the shared constant data from the CPU. For example, referring to FIGS. 4 and 7, register A may be configured for Value1 based on a SetSharedConstant (location A, Value1) instruction and register D may be configured for Value2 based on a SetSharedConstant (location D, Value2) instruction (e.g., GPU 704 may configure the context register, at 712, prior to receiving, at 714, the updated shared constant data from the CPU 702).

At 506, the apparatus may receive, in the at least one register, the shared constant data from the CPU, the shared constant data corresponding to a draw call update of a first draw call of a plurality of draw calls. For example, referring to FIGS. 4 and 7, context register A of the context registers 406 may be updated based on receiving Value3 and a corresponding Draw( ) call instruction of the application 402 (e.g., the GPU 704 may receive, at 714, updated shared constant data in a context register of the GPU 704 from the CPU 702 based on the update, at 710). The at least one register may be at least one of a context register 406 or a pipeline register. Referring to FIGS. 2 and 4, the shared constant data (e.g., Value1 and Value2) may be associated with at least one context register state 261 of the at least one register 260/406.

At 508, the apparatus may configure the at least one register based on the shared constant data corresponding to the draw call update of the first draw call. For example, referring to FIGS. 4 and 7, register A and register D may be configured to store Value1 and Value2, respectively, based on the SetSharedConstant (locationA, Value1) and the SetSharedConstant (locationD, Value2) instructions of the application 402 (e.g., the GPU 704 may configure the context register, at 716, based on the updated shared constant data indicated, at 714, by the CPU 702 as corresponding to the first draw call).

At 510, the apparatus may send the shared constant data corresponding to the draw call update of the first draw call to at least one of a constant memory or a constant buffer. In aspects, the constant memory may be a constant RAM (e.g., constant RAM 410/706). For example, referring to FIGS. 4 and 7, Value1 of register A and Value2 of register D may be sent from the context registers 406 to the constant RAM 410 as constant 2 and constant 3 (e.g., the GPU 704 may send, at 718, the updated shared constant data to the constant RAM 706).

At 512, the apparatus may store the shared constant data in the at least one of the constant memory or the constant buffer. For example, referring to FIGS. 4 and 7, Value1 and Value2 may be stored in the constant RAM 410 (e.g., the GPU 704 may store, at 720, the updated shared constant data in the constant RAM 706).

At 514, the apparatus may receive, in the at least one register, updated shared constant data from the CPU, the updated shared constant data corresponding to a draw call update of a second draw call of the plurality of draw calls, the second draw call being subsequent to the first draw call. For example, referring to FIGS. 4 and 7, context register A of the context registers 406 may be updated to Value3 based on a Draw( ) call instruction and a SetSharedConstant (locationA, Value3) instruction of the application 402 that is subsequent the SetSharedConstant (locationA, Value1) instruction (e.g., the GPU 704 may receive, at 726, second updated shared constant data in the context register of the GPU 704 from the CPU 702 based on the second update, at 724). The at least one register (e.g., context registers 406) may be updated based on the updated shared constant data (e.g., Value3). In aspects, the at least one register (e.g., register A) may be updated independently from at least one other register (e.g., register D).

In configurations, a method or an apparatus for graphics processing is provided. The apparatus may be a GPU, or some other processor that may perform graphics processing. In aspects, the apparatus may be the processing unit 120 within the device 104, or may be some other hardware within the device 104 or another device. The apparatus may include means for receiving, in at least one register, shared constant data from a CPU, the shared constant data corresponding to a draw call update of a first draw call of a plurality of draw calls; and means for configuring the at least one register based on the shared constant data corresponding to the draw call update of the first draw call. The apparatus may further include means for sending the shared constant data corresponding to the draw call update of the first draw call to at least one of a constant memory or a constant buffer. The apparatus may further include means for storing the shared constant data in the at least one of the constant memory or the constant buffer. The apparatus may further include means for configuring a shader preamble for at least one shader prior to receiving the shared constant data from the CPU. The apparatus may further include means for performing an initial configuration of the at least one register prior to receiving the shared constant data from the CPU. The apparatus may further include means for receiving, in the at least one register, updated shared constant data from the CPU, the updated shared constant data corresponding to a draw call update of a second draw call of the plurality of draw calls, the second draw call being subsequent to the first draw call.

Figure 6:
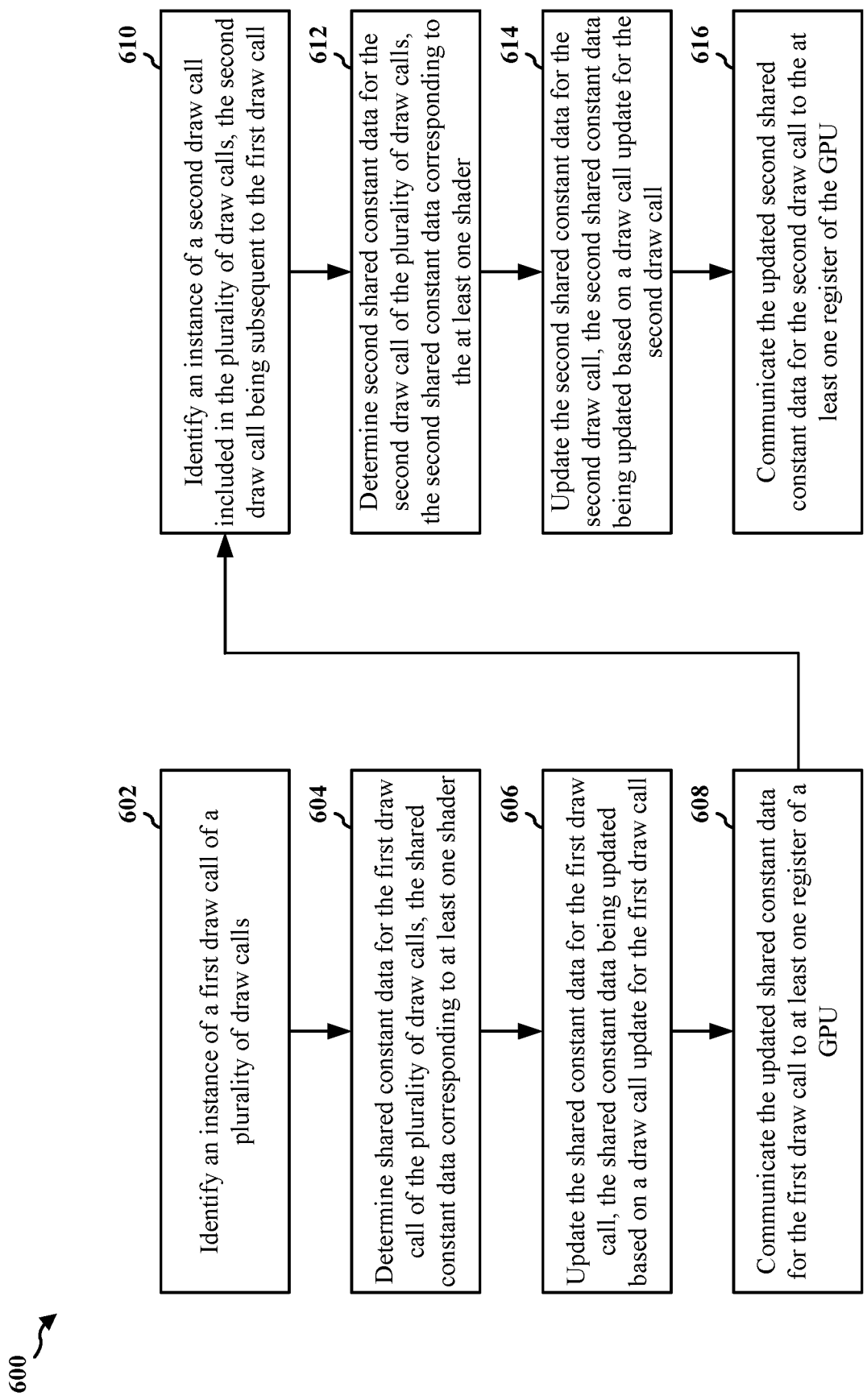
FIG. 6 is a flowchart of an example method of graphics processing in accordance with one or more techniques of this disclosure.

FIG. 6 is a flowchart of an example method 600 in accordance with one or more techniques of this disclosure. The method 600 may be performed by an apparatus, such as an apparatus for graphics processing, a CPU, a wireless communication device, and the like, as used in connection with the aspects of FIGS. 1-4 and 7.

At 602, the apparatus may identify an instance of a first draw call of a plurality of draw calls. For example, referring to FIGS. 4 and 7, the application 402 may include a plurality of Draw( ) call instructions (e.g., the CPU 702 may identify, at 708, the instance of the first draw call). The instance of the first draw call may be identified (e.g., by the CPU 702) based on an indication associated with an application (e.g., 402) of the CPU (e.g., 702).

At 604, the apparatus may determine shared constant data for the first draw call of the plurality of draw calls, the shared constant data corresponding to at least one shader. For example, referring to FIGS. 4 and 7, the application 402 may indicate Value1 and Value2 as shared constant data for a first Draw( ) call instruction (e.g., the CPU 702 may determine, at 710, shared constant data for the first draw call). The shared constant data may be referenced from the application 402 via shader foo 404.

At 606, the apparatus may update the shared constant data for the first draw call, the shared constant data being updated based on a draw call update for the first draw call. For example, referring to FIGS. 4 and 7, a SetSharedConstant instruction of the application 402 may update the shared constant data to Value1 based on a first Draw( ) call instruction (e.g., the CPU 702 may update, at 710, the shared constant data for the first draw call).

At 608, the apparatus may communicate the updated shared constant data for the first draw call to at least one register of a GPU. For example, referring to FIGS. 4 and 7, Value1 may be communicated to register A of the context registers 406 and Value2 may be communicated to register D of the context registers 406 based on the SetSharedConstant (locationA, Value1) instruction and the SetSharedConstant (locationD, Value2) instruction of the application 402 (e.g., the CPU 702 may communicate, at 714, the updated shared constant data to a context register of the GPU 704).

At 610, the apparatus may identify an instance of a second draw call included in the plurality of draw calls, the second draw call being subsequent to the first draw call. For example, referring to FIGS. 4 and 7, the application 402 may include a second Draw( ) call instruction subsequent to the first Draw( ) call instructions (e.g., the CPU 702 may identify, at 722, the instance of the second draw call). The instance of the second draw call may be identified (e.g., by the CPU 702) based on a second indication associated with the application (e.g., 402) of the CPU (e.g., 702).

At 612, the apparatus may determine second shared constant data for the second draw call of the plurality of draw calls, the second shared constant data corresponding to the at least one shader. For example, referring to FIGS. 4 and 7, the application 402 may indicate Value3 as second shared constant data for the second Draw( ) call instruction (e.g., the CPU 702 may determine, at 724, second shared constant data for the second draw call). The second shared constant data may be referenced from the application 402 via shader foo 404.

At 614, the apparatus may update the second shared constant data for the second draw call, the second shared constant data being updated based on a draw call update for the second draw call. For example, referring to FIGS. 4 and 7, a SetSharedConstant instruction of the application 402 may update the shared constant data to Value3 based on a second Draw( ) call instruction (e.g., the CPU 702 may update, at 724, the second shared constant data for the second draw call).

At 616, the apparatus may communicate the updated second shared constant data for the second draw call to the at least one register of the GPU. For example, referring to FIGS. 4 and 7, Value3 may be communicated to register A of the context registers 406 based on the SetSharedConstant (locationA, Value3) instruction of the application 402 (e.g., the CPU 702 may communicate, at 726, second updated shared constant data to the context register of the GPU 704).

In configurations, a method or an apparatus for graphics processing is provided. The apparatus may be a CPU, or some other processor that may perform graphics processing. In aspects, the apparatus may be the processing unit 120 within the device 104, or may be some other hardware within the device 104 or another device. The apparatus may include means for determining shared constant data for a first draw call of a plurality of draw calls, the shared constant data corresponding to at least one shader; means for updating the shared constant data for the first draw call, the shared constant data being updated based on a draw call update for the first draw call; and means for communicating the updated shared constant data for the first draw call to at least one register of a GPU. The apparatus may further include means for identifying an instance of the first draw call of the plurality of draw calls. The apparatus may further include means for identifying an instance of a second draw call included in the plurality of draw calls, the second draw call being subsequent to the first draw call. The apparatus may further include means for determining second shared constant data for the second draw call of the plurality of draw calls, the second shared constant data corresponding to the at least one shader; means for updating the second shared constant data for the second draw call, the second shared constant data being updated based on a draw call update for the second draw call; and means for communicating the updated second shared constant data for the second draw call to the at least one register of the GPU.

Figure 7:
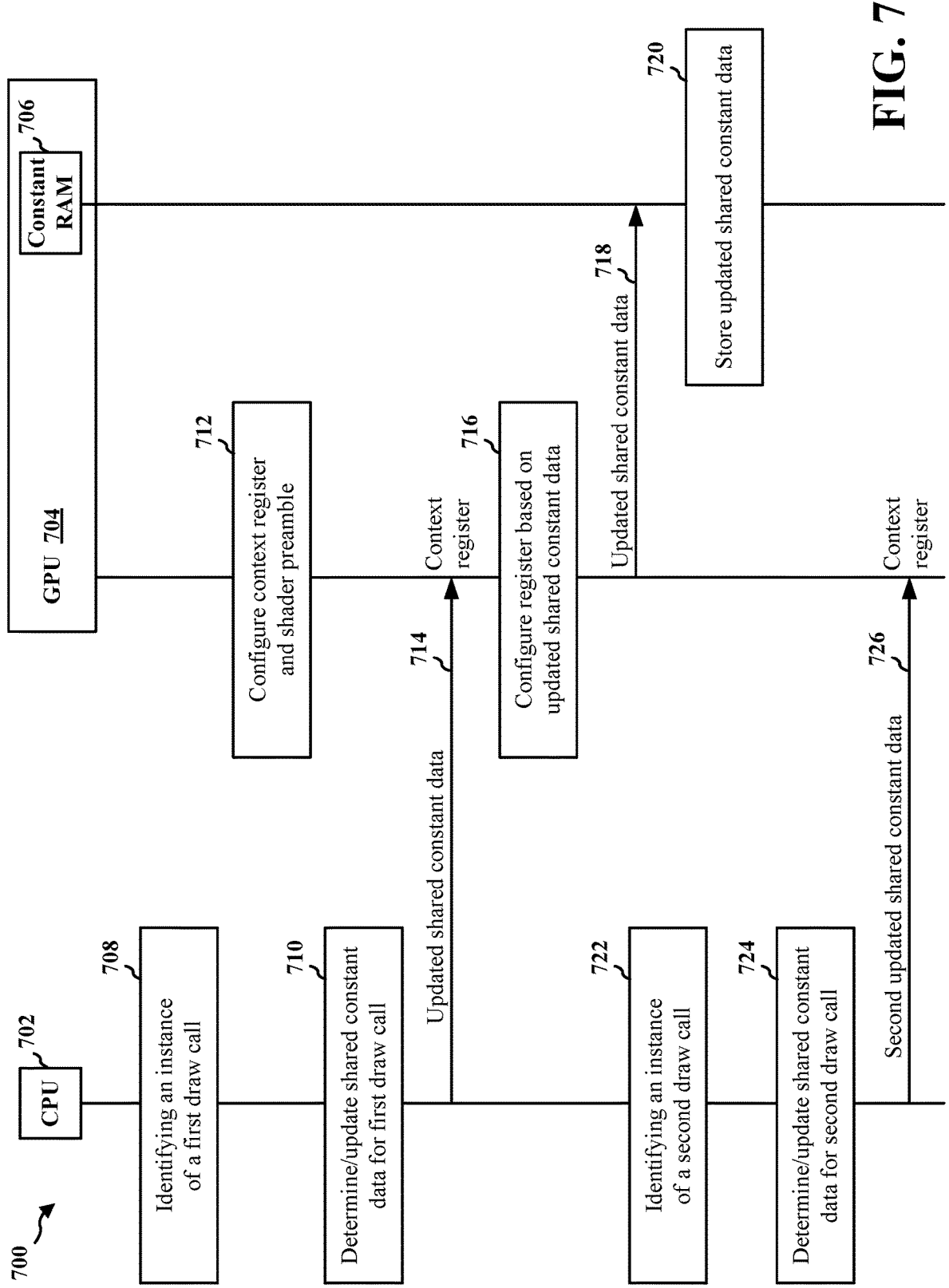
FIG. 7 is a call flow diagram illustrating example communications between a central processing unit (CPU) and a graphics processing unit (GPU).

FIG. 7 is a call flow diagram 700 illustrating example communications between a CPU 702 and a GPU 704. At 708, the CPU 702 may identify an instance of a first draw call. In aspects, an application that executes on the CPU 702 may indicate the first draw call to a GPU driver. The GPU driver may also execute on the CPU 702, such that the CPU 702 may identify, at 708, the instance of the first draw call based on the indication by the application. At 710, the CPU 702 may determine and/or update shared constant data for the first draw call. At 714, the CPU 702 may communicate the updated shared constant data for the first draw call to a context register of the GPU 704.

At 712, the GPU 704 may configure the context register, prior to receiving the updated shared constant data from the CPU 702. The GPU may also configure, at 712, a shader preamble that executes on the GPU 704 prior to execution of a main shader. After the updated shared constant data is provided to the context register, the GPU 704 may configure, at 716, the context register based on the updated shared constant data. In aspects, the GPU 704 may include a constant RAM 706. At 718, the GPU 704 may send the updated shared constant data to the constant RAM 706 to be stored, at 720, for one or more draw calls.

At 722, the CPU 702 may identify an instance of a second draw call. In aspects, the application that executes on the CPU 702 may indicate the second draw call to the GPU driver, such that the CPU 702 may identify the instance of the second draw call based on the indication by the application. At 724, the CPU 702 may determine second shared constant data and update the second shared constant data for the second draw call. At 726, the CPU 702 may communicate second updated shared constant data to the context register of the GPU 704 for the second draw call. That is, the GPU 704 may receive, at 726, the second updated shared constant data and reconfigure/update the context register based on the second updated shared constant data, which may be further communicated to and stored at the constant RAM 706.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

What is claimed is:

1. A method of graphics processing, comprising:
    identifying an instance of a first draw call of a plurality of draw calls based on an indication associated with an application of a central processing unit (CPU);
    determining shared constant data for the first draw call of the plurality of draw calls, the shared constant data corresponding to at least one shader;
    updating the shared constant data for the first draw call, the shared constant data being updated based on a draw call update for the first draw call; and
    communicating the updated shared constant data for the first draw call to at least one register of a graphics processing unit (GPU).

2. The method of claim 1, further comprising identifying an instance of a second draw call included in the plurality of draw calls, the second draw call being subsequent to the first draw call.

3. The method of claim 2, wherein the instance of the second draw call is identified based on a second indication associated with the application of the CPU.

4. The method of claim 2, further comprising:
    determining second shared constant data for the second draw call of the plurality of draw calls, the second shared constant data corresponding to the at least one shader;
    updating the second shared constant data for the second draw call, the second shared constant data being updated based on a draw call update for the second draw call; and
    communicating the updated second shared constant data for the second draw call to the at least one register of the GPU.

5. An apparatus for graphics processing, comprising:
    a memory; and
    at least one processor coupled to the memory and configured to:
        identify an instance of a first draw call of a plurality of draw calls based on an indication associated with an application of a central processing unit (CPU);

determine shared constant data for the first draw call of the plurality of draw calls, the shared constant data corresponding to at least one shader;

update the shared constant data for the first draw call, the shared constant data being updated based on a draw call update for the first draw call; and communicate the updated shared constant data for the first draw call to at least one register of a graphics processing unit (GPU).

6. The apparatus of claim 5, wherein the at least one processor is further configured to identify an instance of a second draw call included in the plurality of draw calls, the second draw call being subsequent to the first draw call.

7. The apparatus of claim 6, wherein, to identify the instance of the second draw call, the at least one processor is configured to identify the instance of the second draw call based on a second indication associated with the application of the CPU.

8. The apparatus of claim 6, wherein the at least one processor is further configured to:

determine second shared constant data for the second draw call of the plurality of draw calls, the second shared constant data corresponding to the at least one shader;

update the second shared constant data for the second draw call, the second shared constant data being updated based on a draw call update for the second draw call; and communicate the updated second shared constant data for the second draw call to the at least one register of the GPU.

9. The apparatus of claim 5, wherein the apparatus is a wireless communication device.

10. A non-transitory computer-readable medium storing computer executable code, the code when executed by at least one processor, causes the at least one processor to:

identify an instance of a first draw call of a plurality of draw calls based on an indication associated with an application of a central processing unit (CPU);

determine shared constant data for the first draw call of the plurality of draw calls, the shared constant data corresponding to at least one shader;

update the shared constant data for the first draw call, the shared constant data being updated based on a draw call update for the first draw call; and communicate the updated shared constant data for the first draw call to at least one register of a graphics processing unit (GPU).

11. The non-transitory computer-readable medium of claim 10, wherein the code when executed by the at least one processor further causes the at least one processor to: identify an instance of a second draw call included in the plurality of draw calls, the second draw call being subsequent to the first draw call.

12. The non-transitory computer-readable medium of claim 11, wherein, to identify the instance of the second draw call, the code when executed by the at least one processor causes the at least one processor to identify the instance of the second draw call based on a second indication associated with the application of the CPU.

13. The non-transitory computer-readable medium of claim 11, wherein the code when executed by the at least one processor further causes the at least one processor to:

determine second shared constant data for the second draw call of the plurality of draw calls, the second shared constant data corresponding to the at least one shader;

update the second shared constant data for the second draw call, the second shared constant data being updated based on a draw call update for the second draw call; and communicate the updated second shared constant data for the second draw call to the at least one register of the GPU.

* * * * *